US012043981B2

(12) United States Patent
Fliearman et al.

(10) Patent No.: US 12,043,981 B2
(45) Date of Patent: Jul. 23, 2024

(54) WORK VEHICLE DRIVE WITH MULTIPLE ELECTRIC MACHINES AND TORQUE COMBINING ASSEMBLY

(71) Applicant: Deere & Company, Moline, IL (US)

(72) Inventors: Steven R. Fliearman, Coffeyville, KS (US); Jeffrey S. Turner, Coffeyville, KS (US); Douglas S. Base, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 916 days.

(21) Appl. No.: 17/032,114

(22) Filed: Sep. 25, 2020

(65) Prior Publication Data

US 2022/0098827 A1     Mar. 31, 2022

(51) Int. Cl.
*E02F 9/20*        (2006.01)

(52) U.S. Cl.
CPC .............. *E02F 9/202* (2013.01); *E02F 9/207* (2013.01); *E02F 9/2079* (2013.01)

(58) Field of Classification Search
CPC ......... E02F 9/202; E02F 9/207; E02F 9/2079; H02K 7/116; F16H 3/728; F16H 37/0826
See application file for complete search history.

(56) References Cited

U.S. PATENT DOCUMENTS

| 1,625,564 A | 4/1927 | Pollard |
| 2,685,948 A | 8/1954 | Freeman et al. |
| 3,062,073 A | 11/1962 | Brass |
| 3,081,759 A | 3/1963 | Mauck et al. |
| 3,150,544 A | 9/1964 | Brass |
| 3,640,152 A | 2/1972 | Shirai et al. |
| 3,675,511 A | 7/1972 | Wakamatsu et al. |
| 3,942,024 A | 3/1976 | Ingham |

(Continued)

FOREIGN PATENT DOCUMENTS

| CN | 106763565 A | 5/2017 |
| DE | 2619011 A1 | 12/1981 |

(Continued)

OTHER PUBLICATIONS

German Search Report issued in German Application No. 102021113924.4 dated Sep. 30, 2021. (7 pages).

(Continued)

*Primary Examiner* — Huan Le
(74) *Attorney, Agent, or Firm* — KLINTWORTH & ROZENBLAT IP LLP

(57) ABSTRACT

A drive assembly for a work vehicle includes an electric machine input arrangement with a first electric machine configured to generate a first source of power, an electric machine input gear assembly configured to receive the first source of power from the first electric machine, and a second electric machine configured to generate a second source of power. The drive assembly further includes a combination gear arrangement coupled to selectively receive the first source of power from the electric machine input gear assembly and the second source of power from the second electric machine to produce a combined power; and an electric machine output arrangement configured to receive and transfer the combined power from the combination gear arrangement.

18 Claims, 8 Drawing Sheets

(56) References Cited

U.S. PATENT DOCUMENTS

| | | | |
|---|---|---|---|
| 4,122,354 A | 10/1978 | Howland | |
| 4,213,299 A | 7/1980 | Sharar | |
| 4,473,752 A | 9/1984 | Cronin | |
| 4,484,495 A | 11/1984 | Mason | |
| 4,569,252 A | 2/1986 | Harper | |
| 4,631,455 A | 12/1986 | Taishoff | |
| 4,708,030 A | 11/1987 | Cordner | |
| 4,750,384 A | 6/1988 | Belliveau | |
| 4,862,009 A | 8/1989 | King | |
| 4,916,980 A | 4/1990 | Asada et al. | |
| 4,926,713 A | 5/1990 | Madill | |
| 5,033,994 A | 7/1991 | Wu | |
| 5,177,968 A | 1/1993 | Fellows | |
| 5,418,400 A | 5/1995 | Stockton | |
| 5,558,173 A | 9/1996 | Sherman | |
| 5,856,709 A | 1/1999 | Ibaraki et al. | |
| 5,993,354 A | 11/1999 | Winks | |
| 6,015,363 A | 1/2000 | Mathis | |
| 6,371,877 B1 | 4/2002 | Schroeder et al. | |
| 6,378,479 B1 | 4/2002 | Nishidate et al. | |
| RE37,743 E | 6/2002 | Yang | |
| 6,409,622 B1 | 6/2002 | Bolz et al. | |
| 6,484,596 B2 | 11/2002 | Puchas | |
| 6,527,658 B2 | 3/2003 | Holmes et al. | |
| 6,569,054 B2 | 5/2003 | Kato | |
| 6,582,333 B2 | 6/2003 | Man | |
| 6,661,109 B2 | 12/2003 | Fukasaku et al. | |
| 6,746,354 B1 | 6/2004 | Ziemer | |
| 6,770,005 B2 | 8/2004 | Aikawa et al. | |
| 6,811,010 B1 | 11/2004 | Armstrong | |
| 6,832,970 B2 | 12/2004 | Eibler | |
| 6,852,063 B2 | 2/2005 | Takahashi et al. | |
| 6,910,453 B2 | 6/2005 | Sugino et al. | |
| 6,965,173 B2 | 11/2005 | Fukasaku et al. | |
| 7,028,794 B2 | 4/2006 | Odahara et al. | |
| 7,044,255 B2 | 5/2006 | Maeda et al. | |
| 7,086,978 B2 | 8/2006 | Aikawa et al. | |
| 7,117,965 B2 | 10/2006 | Yatabe et al. | |
| 7,223,191 B2 | 5/2007 | Aikawa et al. | |
| 7,374,031 B2 | 5/2008 | Skorucak | |
| 7,387,043 B2 | 6/2008 | Sakamoto et al. | |
| 7,503,871 B2 | 3/2009 | Kozarekar et al. | |
| 7,582,033 B2 | 9/2009 | Kefti-Cherif et al. | |
| 7,753,147 B2 | 7/2010 | Usoro | |
| 7,780,562 B2 | 8/2010 | King et al. | |
| 8,143,735 B2 | 3/2012 | Bauer | |
| 8,226,517 B2 | 7/2012 | Tsai et al. | |
| 8,235,859 B2 | 8/2012 | Yun | |
| 8,480,529 B2 | 7/2013 | Pohl et al. | |
| 8,500,601 B2 | 8/2013 | Arnold et al. | |
| 8,584,359 B1 | 11/2013 | Bowman | |
| 8,727,944 B2 | 5/2014 | Noboru et al. | |
| 8,734,281 B2 * | 5/2014 | Ai | B60K 6/365 475/5 |
| 8,996,227 B2 | 3/2015 | Sisk et al. | |
| 9,017,207 B2 | 4/2015 | Pohl et al. | |
| 9,074,656 B2 | 7/2015 | Benz et al. | |
| 9,145,136 B2 | 9/2015 | Suntharalingam et al. | |
| 9,184,646 B2 | 11/2015 | Fulton | |
| 9,261,064 B2 | 2/2016 | Patel et al. | |
| 9,371,810 B2 | 6/2016 | Creviston | |
| 9,421,855 B2 | 8/2016 | Suntharalingam et al. | |
| 9,541,172 B1 | 1/2017 | Wright | |
| 9,555,795 B2 | 1/2017 | Nefcy et al. | |
| 9,676,265 B2 | 6/2017 | Choi | |
| 9,726,282 B2 | 8/2017 | Pohl et al. | |
| 9,829,103 B2 | 11/2017 | Volpert | |
| 9,862,260 B2 | 1/2018 | Lee | |
| 10,167,906 B2 | 1/2019 | Neelakantan et al. | |
| 10,183,569 B2 | 1/2019 | Toyota et al. | |
| 10,422,389 B2 | 9/2019 | Ebihara | |
| 10,479,187 B2 | 11/2019 | Lubben et al. | |
| 10,487,918 B2 | 11/2019 | Turner et al. | |
| 10,518,626 B2 | 12/2019 | Pettersson | |
| 10,519,920 B2 | 12/2019 | Patil et al. | |
| 10,591,025 B2 | 3/2020 | Fliearman et al. | |
| 10,619,711 B2 | 4/2020 | Fliearman et al. | |
| 10,900,454 B1 | 1/2021 | Fliearman et al. | |
| 11,047,453 B2 * | 6/2021 | Osada | F16H 48/10 |
| 2001/0019210 A1 | 9/2001 | Fukasaku et al. | |
| 2001/0025621 A1 | 10/2001 | Shiraishi et al. | |
| 2001/0042649 A1 | 11/2001 | Maeda et al. | |
| 2002/0019284 A1 | 2/2002 | Aikawa et al. | |
| 2002/0033059 A1 | 3/2002 | Pels | |
| 2002/0117860 A1 | 8/2002 | Man et al. | |
| 2002/0139592 A1 | 10/2002 | Fukasaku et al. | |
| 2002/0177504 A1 | 11/2002 | Pels | |
| 2003/0001391 A1 | 1/2003 | Kuang et al. | |
| 2003/0104900 A1 | 6/2003 | Takahashi | |
| 2003/0224888 A1 | 12/2003 | Wilder et al. | |
| 2004/0055800 A1 | 3/2004 | Katou et al. | |
| 2004/0116226 A1 | 6/2004 | Baker et al. | |
| 2006/0111211 A1 | 5/2006 | Kefti-Cherif et al. | |
| 2006/0154771 A1 | 7/2006 | Kleman et al. | |
| 2006/0166777 A1 | 7/2006 | Aikawa et al. | |
| 2007/0108006 A1 | 5/2007 | Schmid et al. | |
| 2007/0157899 A1 | 7/2007 | Seufert et al. | |
| 2007/0265126 A1 | 11/2007 | Janson et al. | |
| 2008/0162007 A1 | 7/2008 | Ishii et al. | |
| 2008/0179119 A1 | 7/2008 | Grenn et al. | |
| 2008/0179159 A1 | 7/2008 | Pollman | |
| 2008/0314195 A1 | 12/2008 | Andoh et al. | |
| 2009/0055061 A1 | 2/2009 | Zhu | |
| 2009/0176611 A1 | 7/2009 | Avery | |
| 2009/0264241 A1 | 10/2009 | Dittrich et al. | |
| 2009/0312145 A1 | 12/2009 | Pohl et al. | |
| 2010/0029428 A1 | 2/2010 | Abe et al. | |
| 2010/0044183 A1 | 2/2010 | Guggolz et al. | |
| 2010/0048338 A1 | 2/2010 | Si | |
| 2010/0063704 A1 | 3/2010 | Okubo et al. | |
| 2010/0076634 A1 | 3/2010 | Brigham | |
| 2010/0190602 A1 | 7/2010 | Wittkopp et al. | |
| 2010/0234166 A1 | 9/2010 | Samie et al. | |
| 2011/0010031 A1 | 1/2011 | Syed et al. | |
| 2011/0015020 A1 | 1/2011 | Grosser | |
| 2011/0053729 A1 | 3/2011 | Parsons et al. | |
| 2011/0070999 A1 | 3/2011 | Soliman et al. | |
| 2011/0152026 A1 | 6/2011 | Williams | |
| 2011/0263379 A1 | 10/2011 | Liang et al. | |
| 2012/0103293 A1 | 5/2012 | Robinette et al. | |
| 2012/0165156 A1 | 6/2012 | Oguri | |
| 2012/0235473 A1 | 9/2012 | Jiang et al. | |
| 2012/0240723 A1 | 9/2012 | Gluckler et al. | |
| 2012/0316026 A1 | 12/2012 | Oguri et al. | |
| 2013/0046427 A1 | 2/2013 | Hohenberg | |
| 2013/0252773 A1 | 9/2013 | Suntharalingam et al. | |
| 2013/0316873 A1 | 11/2013 | Jansen et al. | |
| 2014/0011619 A1 | 1/2014 | Pohl et al. | |
| 2014/0128205 A1 | 5/2014 | Phillips et al. | |
| 2014/0137824 A1 | 5/2014 | Jacques et al. | |
| 2014/0150604 A1 | 6/2014 | Kaltenbach | |
| 2014/0256490 A1 | 9/2014 | Honda | |
| 2015/0143936 A1 | 5/2015 | Eo et al. | |
| 2015/0226323 A1 | 8/2015 | Pohl et al. | |
| 2015/0239335 A1 | 8/2015 | Wachter et al. | |
| 2016/0031438 A1 | 2/2016 | Matsui et al. | |
| 2016/0031439 A1 | 2/2016 | Nefcy et al. | |
| 2016/0052382 A1 | 2/2016 | Clark et al. | |
| 2016/0076629 A1 | 3/2016 | Modrzejewski et al. | |
| 2016/0082821 A1 | 3/2016 | Mueller et al. | |
| 2016/0096522 A1 | 4/2016 | Ortmann et al. | |
| 2016/0137045 A1 | 5/2016 | Zhu et al. | |
| 2016/0200311 A1 | 7/2016 | Nefcy et al. | |
| 2016/0207525 A1 | 7/2016 | Nefcy et al. | |
| 2016/0258495 A1 | 9/2016 | Bird | |
| 2016/0288780 A1 | 10/2016 | Shukla et al. | |
| 2016/0348741 A1 | 12/2016 | Niemiec et al. | |
| 2017/0050508 A1 | 2/2017 | Pritchard et al. | |
| 2017/0248196 A1 | 8/2017 | Turner et al. | |
| 2017/0328470 A1 | 11/2017 | Pohl et al. | |
| 2017/0368925 A1 | 12/2017 | Maki | |
| 2018/0100564 A1 | 4/2018 | Fliearman et al. | |
| 2018/0106365 A1 | 4/2018 | Tsukizaki et al. | |
| 2018/0112530 A1 | 4/2018 | Fliearman et al. | |

(56) References Cited

U.S. PATENT DOCUMENTS

| | | |
|---|---|---|
| 2018/0149247 A1 | 5/2018 | Rekow et al. |
| 2018/0172124 A1 | 6/2018 | Valente et al. |
| 2018/0186230 A1 | 7/2018 | Fukuda et al. |
| 2018/0236864 A1 | 8/2018 | Imamura et al. |
| 2018/0238443 A1 | 8/2018 | Aulin et al. |
| 2018/0244145 A1 | 8/2018 | Ohnemus et al. |
| 2018/0298993 A1 | 10/2018 | Fliearman et al. |
| 2019/0084555 A1 | 3/2019 | Omura et al. |
| 2019/0160936 A1 | 5/2019 | Lubben et al. |
| 2019/0176609 A1 | 6/2019 | Bando |
| 2019/0176806 A1 | 6/2019 | Trent |
| 2019/0219022 A1 | 7/2019 | Patil et al. |
| 2019/0344655 A1 | 11/2019 | Pettersson |
| 2019/0351751 A1 | 11/2019 | Sato et al. |
| 2020/0331337 A1 | 10/2020 | Fliearman et al. |
| 2020/0331338 A1 | 10/2020 | Fliearman et al. |
| 2020/0332754 A1 | 10/2020 | Fliearman et al. |
| 2020/0332756 A1 | 10/2020 | Fliearman et al. |
| 2020/0332757 A1 | 10/2020 | Fliearman et al. |
| 2020/0332864 A1 | 10/2020 | Fliearman et al. |
| 2020/0332865 A1 | 10/2020 | Fliearman et al. |
| 2020/0332866 A1 | 10/2020 | Fliearman et al. |
| 2020/0332867 A1 | 10/2020 | Fliearman et al. |
| 2020/0332868 A1 | 10/2020 | Fliearman et al. |
| 2021/0372503 A1 | 12/2021 | Fliearman et al. |
| 2021/0372504 A1 | 12/2021 | Fliearman et al. |
| 2022/0267990 A1 | 8/2022 | Fliearman et al. |
| 2022/0267991 A1 | 8/2022 | Dhanal et al. |

FOREIGN PATENT DOCUMENTS

| | | |
|---|---|---|
| DE | 3120675 A1 | 2/1982 |
| DE | 3444562 A1 | 6/1985 |
| DE | 69218975 T2 | 6/1994 |
| DE | 69008994 T2 | 12/1994 |
| DE | 10007959 A1 | 9/1998 |
| DE | 19745995 A1 | 9/1998 |
| DE | 19927521 A1 | 6/2000 |
| DE | 19911924 A1 | 9/2000 |
| DE | 19923316 A1 | 11/2000 |
| DE | 10003741 A1 | 4/2001 |
| DE | 10103726 A1 | 8/2002 |
| DE | 102006037576 A1 | 4/2008 |
| DE | 112007000573 | 1/2009 |
| DE | 102010007612 | 10/2010 |
| DE | 102010005178 | 11/2010 |
| DE | 102010030570 A1 | 12/2011 |
| DE | 102010030571 A1 | 12/2011 |
| DE | 102010060140 A1 | 4/2012 |
| DE | 102011080068 A1 | 1/2013 |
| DE | 102011089708 A1 | 6/2013 |
| DE | 102011089709 A1 | 6/2013 |
| DE | 102011089710 A1 | 6/2013 |
| DE | 112011103973 T5 | 10/2013 |
| DE | 102008045202 A1 | 3/2014 |
| DE | 102013203009 A1 | 8/2014 |
| DE | 102013012747 A1 | 9/2014 |
| DE | 102013206970 A1 | 10/2014 |
| DE | 102013209022 A1 | 11/2014 |
| DE | 102014200720 A1 | 2/2015 |
| DE | 102014200723 B3 | 2/2015 |
| DE | 102013219948 A1 | 4/2015 |
| DE | 102014225298 A1 | 7/2015 |
| DE | 112014000378 T5 | 9/2015 |
| DE | 112014000411 T5 | 10/2015 |
| DE | 102017203026 A1 | 8/2017 |
| DE | 102017204269 A1 | 9/2017 |
| DE | 112016004789 | 7/2018 |
| DE | 102018122936 | 3/2020 |
| DE | 102019204909 A1 | 10/2020 |
| DE | 102020204705 A1 | 10/2020 |
| DE | 102020204795 A1 | 10/2020 |
| DE | 102022200804 A1 | 8/2022 |
| EP | 645271 B1 | 3/1995 |
| EP | 2272702 A2 | 1/2011 |
| EP | 2664785 | 11/2013 |
| EP | 1069310 B4 | 3/2014 |
| GB | 650564 | 2/1951 |
| GB | 2506199 A | 3/2014 |
| JP | 04296649 A | 10/1992 |
| JP | 2003267079 A | 9/2003 |
| JP | 2015116004 A | 6/2015 |
| WO | 200100088369 A1 | 11/2001 |
| WO | 200700107458 | 9/2007 |
| WO | 2012078203 A1 | 6/2012 |
| WO | 2018028745 | 2/2018 |

OTHER PUBLICATIONS

USPTO non-final office action issued in pending Utility U.S. Appl. No. 16/386,052 dated Oct. 30, 2020.
USPTO pending Utility U.S. Appl. No. 16/887,973, filed May 29, 2020.
USPTO pending Utility U.S. Appl. No. 16/887,998, filed May 29, 2020.
USPTO Non-Final Office Action dated May 13, 2022 for Utility U.S. Appl. No. 17/185,713.
USPTO Non-Final Office Action issued in U.S. Appl. No. 17/325,437 dated Feb. 9, 2023 9 pages.
German Search Report issued in application No. DE 102022203350.7 dated Jan. 17, 2023 with translation 12 pages.
USPTO non-final office action issued in pending Utility U.S. Appl. No. 16/887,973 dated Jan. 31, 2022.
USPTO non-final office action issued in pending Utility U.S. Appl. No. 17/080,562 dated Dec. 6, 2021.
German Search Report issued in German Application No. 102021113913.9 dated Sep. 30, 2021. (8 pages).
USPTO non-final office action issued in pending Utility U.S. Appl. No. 16/385,860 dated Nov. 4, 2020.
German Search Report issued in application No. DE102022206133.0 dated Oct. 12, 2022 with machine translation (26 pages).
German Search Report issued in application No. DE 102021209339.6 dated Feb. 15, 2022 with translation, 17 pages.
USPTO Non-Final Office Action issued in U.S. Appl. No. 17/185,692 dated Apr. 21, 2023 9 pages.
Non-Final Office Action issued in U.S. Appl. No. 17/,216,243 dated Dec. 13, 2022, 22 pages.
German Search Report issued in application No. DE102022200804.9 dated Sep. 22, 2022 with machine translation (20 pages).
German Search Report issued in application No. DE102022200825.1 dated Sep. 27, 2022 with machine translation (26 pages).
Deere & Company, Utility U.S. Appl. No. 16/385,784, filed Apr. 16, 2019.
Deere & Company, Utility U.S. Appl. No. 16/385,860, filed Apr. 16, 2019.
Deere & Company, Utility U.S. Appl. No. 16/385,892, filed Apr. 16, 2019.
Deere & Company, Utility U.S. Appl. No. 16/385,934, filed Apr. 16, 2019.
Deere & Company, Utility U.S. Appl. No. 16/385,964, filed Apr. 16, 2019.
Deere & Company, Utility U.S. Appl. No. 16/385,989, filed Apr. 16, 2019.
Deere & Company, Utility U.S. Appl. No. 16/386,001, filed Apr. 16, 2019.
Deere & Company, Utility U.S. Appl. No. 16/386,020, filed Apr. 16, 2019.
Deere & Company, Utility U.S. Appl. No. 16/386,052, filed Apr. 16, 2019.
Deere & Company, Utility U.S. Appl. No. 16/386,075, filed Apr. 16, 2019.
Deere & Company, Utility U.S. Appl. No. 16/840,008, filed Apr. 3, 2020.
NTN Automotive Sales Headquarters, Compact Clutch Integrated Pulley for Alternators, NTN Technical Review No. 75, 2007.
Harmonic Drive LLC, Harmonic Planetary Precision Gearing & Motion Control, Product Brochure, Mar. 2006.

(56) References Cited

OTHER PUBLICATIONS

Joan-Adrian Viorel et al., Integrated Starter-Generators For Automotive Applications, Technical University of Cluj-Romania, Dept. of Electrical Machines, vol. 45, No. 3, 2004.
North Atalantic Starter, Starter Drives Explained, Northatlan.com, 2005.
German Search Report for application No. 1020172030267 dated Aug. 4, 2017.
German Search Report for application No. 1020182189080 dated May 27, 2019.
German Search Report for application No. 1020182214956 dated May 28, 2019.
German Search Report for application No. 1020182180784 dated Jun. 4, 2019.
German Search Report for application No. 1020202046468 dated Sep. 1, 2020.
German Search Report for application No. 1020202047057 dated Sep. 1, 2020.
German Search Report for application No. 1020202047952 dated Sep. 2, 2020.
German Search Report for application No. 1020202047049 dated Sep. 3, 2020.
German Search Report for application No. 1020202047065 dated Sep. 3, 2020.
German Search Report for application No. 1020202049433 dated Sep. 4, 2020.
German Search Report for application No. 1020202030634 dated Sep. 4, 2020.
German Search Report for application No. 1020202046425 dated Sep. 4, 2020.
USPTO Final Office Action dated Mar. 8, 2019 for Utility U.S. Appl. No. 15/056,767.
USPTO Final Office Action dated Jun. 11, 2018 for Utility U.S. Appl. No. 15/056,767.
USPTO Non-Final Office Action dated Sep. 9, 2019 for Utility U.S. Appl. No. 15/834,356.
USPTO Non-Final Office Action dated Nov. 2, 2017 for Utility U.S. Appl. No. 15/056,767.
USPTO Non-Final Office Action dated Sep. 28, 2018 for Utility U.S. Appl. No. 15/056,767.
USPTO Non-Final Office Action dated Nov. 1, 2018 for Utility U.S. Appl. No. 15/825,520.
USPTO Non-Final Office Action dated Feb. 25, 2019 for Utility U.S. Appl. No. 15/834,356.
USPTO Non-Final Office Action dated Mar. 4, 2020 for Utility U.S. Appl. No. 16/385,934.
USPTO Non-Final Office Action dated Jun. 19, 2020 for Utility U.S. Appl. No. 16/386,075.
USPTO Non-Final Office Action dated Aug. 24, 2020 for Utility U.S. Appl. No. 16/385,964.
USPTO Non-Final Office Action dated Aug. 24, 2020 for Utility U.S. Appl. No. 16/385,784.

* cited by examiner

WORK VEHICLE DRIVE WITH MULTIPLE ELECTRIC MACHINES AND TORQUE COMBINING ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicle drive systems, including drive assemblies for effecting multi-speed rotational outputs in implementations such as wheel end drives.

BACKGROUND OF THE DISCLOSURE

Work vehicles, such as those used in the agriculture, construction, and forestry industries, and other conventional vehicles, may be powered by an internal combustion engine (e.g., a diesel engine) and/or one or more electric power sources (e.g., electric machines). Various drive arrangements may be employed in the vehicle to effect power transfer from the prime or secondary power sources. For example, the vehicle power and drive line may include one or more drive assemblies to effect one or more output speeds for operating certain vehicle components. For example, wheel end drives, final drives, and the like may provide one or more gear ratios to transfer terminal or near terminal power to the tractive ground-engaging wheels or tracks of the vehicle. Efficient and smooth operation through the speed and torque ranges required of such drives is desirable.

SUMMARY OF THE DISCLOSURE

This disclosure provides a multi-speed drive assembly such as may be used in work vehicles (e.g., as tractive wheel drives).

In one aspect, the disclosure provides a drive assembly for a work vehicle that includes an electric machine input arrangement with a first electric machine configured to generate a first source of power, an electric machine input gear assembly configured to receive the first source of power from the first electric machine, and a second electric machine configured to generate a second source of power. The drive assembly further includes a combination gear arrangement coupled to selectively receive the first source of power from the electric machine input gear assembly and the second source of power from the second electric machine to produce a combined power; and an electric machine output arrangement configured to receive and transfer the combined power from the combination gear arrangement.

In another aspect, the disclosure provides a drive assembly for a work vehicle that includes an electric machine input arrangement with a first electric machine configured to generate a first source of power, an electric machine input gear assembly configured to receive and condition the first source of power from the first electric machine according to a plurality of gear ratios, and a second electric machine configured to generate a second source of power. The drive assembly further includes a combination gear arrangement coupled to selectively receive the first source of power from the electric machine input gear assembly and the second source of power from the second electric machine to produce a combined power; an electric machine output arrangement configured to receive and transfer the combined power from the combination gear arrangement; and a control system coupled to the electric machine input gear assembly. The control system is configured to selectively operate the electric machine input gear assembly in one of at least: a low state in which the electric machine input gear assembly transfers the first source of power to the combination gear arrangement at a reduced gear ratio, a direct state in which the electric machine input gear arrangement transfers the first source of power to the combination gear arrangement at a direct gear ratio, and a disconnected state in which the electric machine input gear assembly disconnects the first source of power through the electric machine input gear assembly. The control system is configured to selectively operate the electric machine input arrangement in one of at least: a first mode in which the first electric machine is activated, the second electric machine is activated, and the electric machine input gear assembly is placed into the low state, a second mode in which the first electric machine is deactivated, the second electric machine is activated, and the electric machine input gear assembly is placed into the disconnected state, and a third mode in which the first electric machine is activated, the second electric machine is activated, and the electric machine input gear assembly is placed into the direct state.

In further aspect, the disclosure provides a wheel end drive coupled to a wheel of a work vehicle that includes an electric machine input arrangement with a first electric machine configured to generate a first source of power, an electric machine input gear assembly configured to receive the first source of power from the first electric machine, and a second electric machine configured to generate a second source of power. The wheel end drive further includes a combination gear arrangement coupled to selectively receive the first source of power from the electric machine input gear assembly and the second source of power from the second electric machine to produce a combined power; an electric machine output arrangement configured to receive and transfer the combined power from the combination gear arrangement; and a wheel end planetary gear set coupled to receive and transfer the combined power from the electric machine output arrangement to the wheel of the work vehicle.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
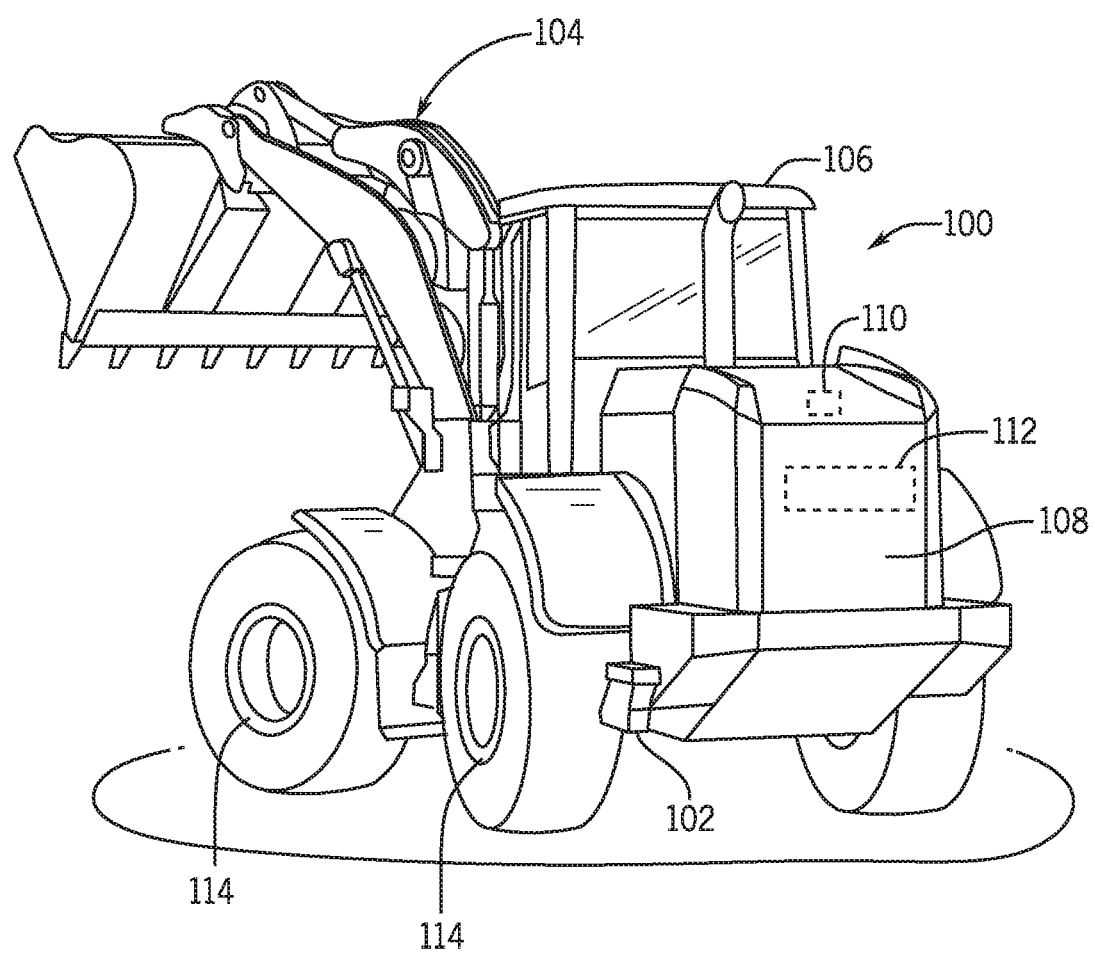
FIG. 1 is a schematic side view of an example work vehicle in the form of a wheel loader in which the disclosed drive assembly may be employed.

The following describes one or more example embodiments of the disclosed drive assembly as a wheel end drive, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "axial" refers to a dimension that is generally parallel to an axis of rotation, axis of symmetry, or centerline of a component or components. For example, in a cylinder or disc with a centerline and opposite, generally circular ends or faces, the "axial" dimension may refer to the dimension that generally extends in parallel to the centerline between the opposite ends or faces. In certain instances, the term "axial" may be utilized with respect to components that are not cylindrical (or otherwise radially symmetric). For example, the "axial" dimension for a rectangular housing containing a rotating shaft may be viewed as a dimension that is generally in parallel with the rotational axis of the shaft. Furthermore, the term "radially" as used herein may refer to a dimension or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial dimension. Additionally, the term "circumferential" may refer to a collective tangential dimension that is perpendicular to the radial and axial dimensions about an axis.

Generally, the disclosure provides a drive assembly as a wheel end drive that is selectively or alternatively operable with dual electric machines at the input side of the drive. Without fundamental change to many of the internal or external components of the wheel end drive and/or other aspects of the drive train, the drive assembly may receive rotational input power and transmit rotational output power at various speeds and torques in either clock direction, as desired. Multiple such drive assemblies with common internal and external hardware may thus be employed for oppositely facing shafts that are required to rotate in opposite clock directions to collectively effect one motion of the vehicle or subsystem thereof, such as to provide a tractive force in opposite clock directions to ground-engaging wheels or tracks at opposite sides of the vehicle to collectively propel the vehicle either in a forward or the rearward travel direction. In one example implementation, the wheel end drive may be employed in a common configuration for all wheels of the vehicle.

As noted, in certain embodiments, the drive assembly as a wheel end drive is or includes power transmission arrangements with one or more gear sets that are driven by a power source, such as two or more electric machines. The gear set transmits rotational power from the electric machines directly or via an intermediate or input gear arrangement to an arrangement that combines and transfers the torques to a rotating output member. The output member may be a further intermediate component or tied directly to the driven component. The one or more gear sets may effect ratio changes between the input power sources and the output member, directly transmit the power without a change in ratio, or a combination thereof. The output member may thus rotate at the same speed as, or one or more different speeds than, the input power source or input shaft. The gear sets may take any of various forms including arrangements with enmeshing spur or other gears as well as arrangements with one or more planetary gear sets. Large gear reduction ratios may be achieved by the drive assembly such that individual or cooperating electric machines may be used and operated at suitable speeds for one or more speed and torque outputs.

Further, in certain embodiments, the drive assembly as a wheel end drive may automatically and/or selectively shift gear ratios (i.e., shift between power flow paths having different gear ratios), particularly in the input gear arrangement associated with one or more of the electric machines. The drive assembly may include one or more active engagement components that engage or disengage to effect power transmission through a power flow path. In this manner, clutch configurations may be employed to carry out the ratio changes with appropriate control hardware and logic. Selective engagement of the multiple clutch elements by the actuation components thereby allows the drive assembly to output multiple output speeds and torques.

In one example, the clutch apparatuses of the input clutch arrangements include first and second clutch apparatuses selectively actuated to engage a planetary gear set to modify power flow from at least one of the electric machines. Engagement of the first clutch apparatus grounds a component of the planetary gear set to effect a first gear ratio and output rotation speed and torque; and engagement of the second clutch apparatus fixes other components of the planetary gear set to effect a second gear ratio and output rotation speed and torque. Such a multi-speed drive assembly may thus effect power at different speeds and torques.

In certain embodiments, one gear assembly is associated with one of the electric machines on the input side of the wheel end drive. The gear assembly enables the first electric machine power to be conditioned prior to being combined with power from one or more other electric machines. Such an arrangement provides an input arrangement in which the electric machines may be used individually or collectively depending on speed and torque requirements, including in a low speed/high torque mode in which the torque of the first electric machine is multiplied by the gear ratio of the input gear assembly prior to being combined with the torque of the second electric machine; a high speed unassisted mode in which the first electric machine is disconnected and direct power from the second electric machine is transferred through the end drive; and a high speed assisted mode in which direct power torque from the first electric machine is combined with the torque of the second electric machine.

The drive assembly disclosed herein may be useful for any number of work or conventional vehicle applications. In the work vehicle context, the drive assembly may power various sub-systems including various aspects of the power and drive trains of the vehicle. As one example, the drive assembly may be or be incorporated into a wheel end drive for providing tractive power to the ground-engaging wheels or tracks of the vehicle. The drive assembly may be incorporated into the power and drive train at the wheel/track ends (e.g., one at each ground-engaging wheel or track) in which case the drive assembly may be considered a "final drive" that couples directly or through a downstream gearset to the wheel or track carrying hub, as primarily described below. However, the examples discussed below are also applicable to a drive assembly that is positioned at an intermediate location between the wheels/tracks and the prime mover or transmission.

The following describes one or more example implementations of the disclosed drive assembly as a wheel end drive. Discussion herein may sometimes focus on the example application of a wheel end drive assembly of a wheel loader, but the disclosed drive assembly is suitable for other types of drives, components, and work vehicles, including various other construction machines (e.g., crawlers, motor graders, dump trucks) as well as various agriculture or forestry machines (e.g., combines, harvesters, balers, mowers, forwarders, forestry skidders and so on) and utility vehicles.

Referring to FIG. 1, in some embodiments, the disclosed work vehicle 100 may be a wheel loader although, as noted, the drive assembly described herein may be applicable to a variety of machines. As shown, the work vehicle 100 may be considered to include a structural main frame or chassis 102 supporting a work implement 104 that is selectively positioned by various combinations of structural elements (e.g., arms, crossbars, pivot joints, etc.) and controllably moved utilizing any number of actuators, such as hydraulic cylinders. The work vehicle 100 may further be considered to include an operator cabin 106, a power and drive train 108, a control system 110, and a hydraulic system 112. The work vehicle 100 may be supported off the ground by ground-engaging wheels or tracks. In the illustrated example, the work vehicle 100 includes a front axle with steerable front wheels 114 (one at each left or right lateral side of the work vehicle 100) and a rear axle with non-steerable rear wheels 114 (one or more at each left or right side of the work vehicle 100).

Figure 2A:
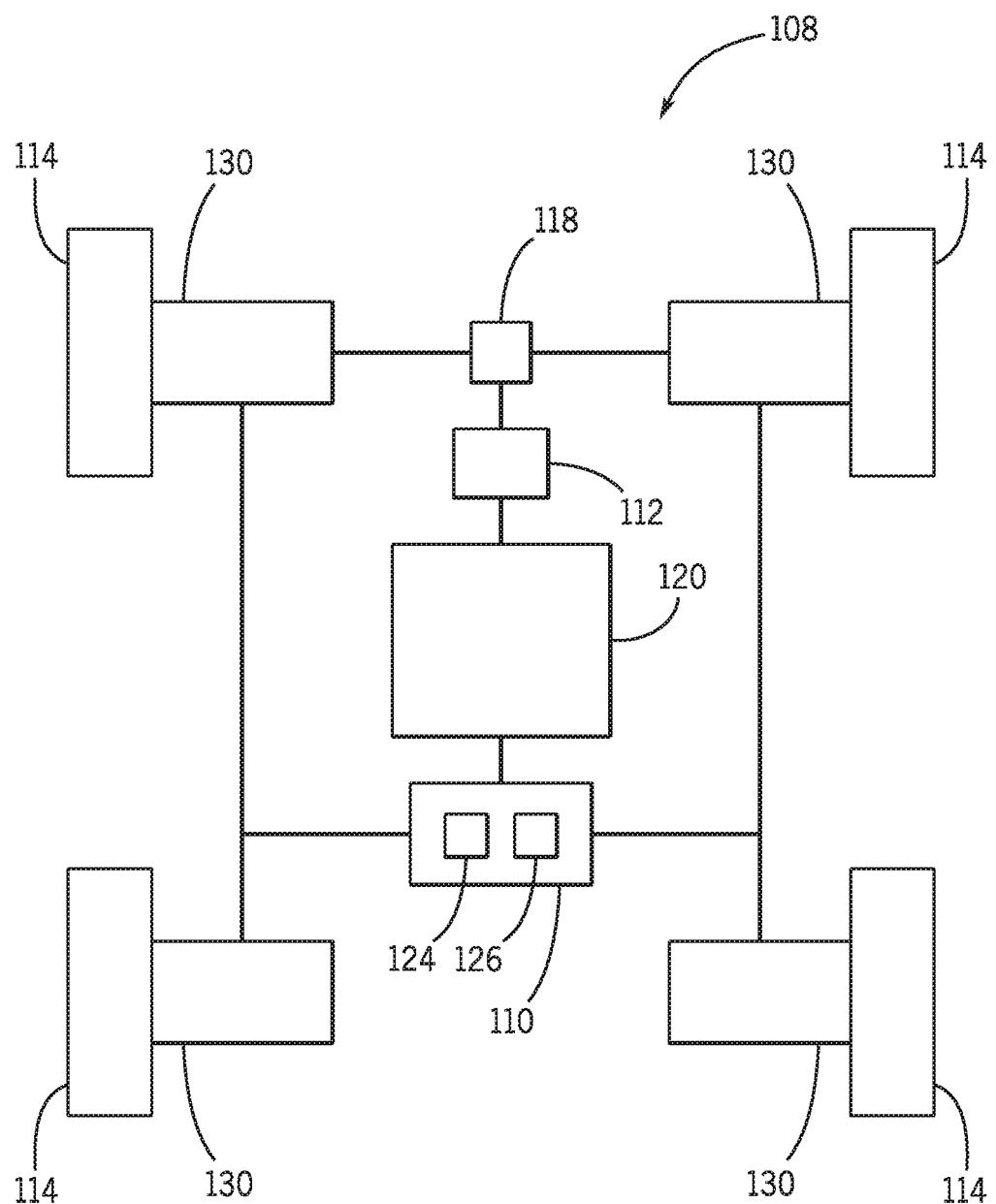
FIG. 2A is a schematic diagram of certain components of a power and drive train for the example work vehicle of FIG. 1.

Referring also to FIG. 2A, the power and drive train 108 has wheel steering components 118, including various devices (e.g., power steering pumps and lines, steering mechanisms, and the like) that couple manual (e.g., operator steering controls or wheel) and/or automated (via the control system 110) steering input to the wheels, such as the steerable wheels 114. The power and drive train 108 includes a prime mover, such as an engine 120, which supplies power to the work vehicle 100, as either direct mechanical power or after being converted to electric or hydraulic power. In one example, the engine 120 is an internal combustion engine, such as a diesel engine, having an engine shaft for outputting mechanical power. The engine 120 is controlled by an engine control module (not shown) of the control system 110. It should be noted that the use of an internal combustion engine is merely an example, as the prime power source may use one or more fuel cells, electric motors, hybrid-gas electric motors, or other power-producing devices. As noted below, the engine 120 may particularly provide electrical power to one or more wheel end drives 130 associated with one or more wheels 114.

The engine 120 provides power to onboard mechanical, electrical, and hydraulic subsystems of the work vehicle 100 governing such things as tractive power to propel the work vehicle 100 and for off-boarding power to other sub-systems remote from the work vehicle 100. For example, the engine 120 may provide mechanical power that is converted to an electric format to run the electronics of the control system 110 and one or more electric drives of the work vehicle 100. The control system 110 thus may have mechanical to electrical power conversion components 124, one or more batteries 126, and associated electronics, including various alternators, generators, voltage regulators, rectifiers, inverters, and the like. The control system 110 may be configured as a computing device or electronic control unit (ECU) with associated processor devices and memory architectures, as a hard-wired computing circuit (or circuits), as a programmable circuit, as a hydraulic, electrical, or electro-hydraulic controller.

The control system 110 may be configured to execute various computational and control functionality with respect to the work vehicle 100, including various devices associated with the power and drive train 108, the hydraulic system 112, and various additional components of the work vehicle 100. In some embodiments, the control system 110 may be configured to receive input signals in various formats (e.g., as hydraulic signals, voltage signals, current signals, and so on), and to output command signals in various formats (e.g., as hydraulic signals, voltage signals, current signals, mechanical movements such as rotation, and so on). The control system 110 is configured to operate various aspects of the disclosed drive assembly, including electromechanical actuators (e.g., solenoids), which may form part of the power and drive train 108 or part of another subsystem of the work vehicle 100, such as in the wheel end drives 130 discussed below.

In some embodiments, the control system 110 may include or be configured to receive input commands from, or otherwise interface with, a human-machine interface or operator interface (not shown) and various sensors, units, and systems onboard or remote from the work vehicle 100. In response, the control system 110 may generate one or more types of commands for implementation by various systems of the work vehicle 100. The control system 110 may additionally or alternatively operate autonomously without input from a human operator, communicating with other systems or devices (including other controllers) in various known ways, including via a CAN bus (not shown), via wireless or hydraulic communication means, or otherwise. In one example and as discussed in greater detail below, the control system 110 may command current to electromagnets associated with an actuator assembly to engage and/or disengage various clutches within the drive train 108.

The engine 120 may also provide mechanical power that is converted to hydraulic format to power various hydraulic drives, pumps and compressors that pressurize fluid to drive various actuators of the hydraulic system 112 in order to power components of the work vehicle 100, such as the work implement 104, wheel steering and braking, a towbehind work implement (not shown), or the like. In this example, the work vehicle 100 supports the mounting of the work implement 104 as a loader with linkage boom arms and a bucket that may be raised and lowered during operation by one or more hydraulic piston-cylinder devices. The hydraulic system 112 may be coupled to and operated by the control system 110 autonomously or in response to commands from an operator input device (e.g., operator controls, operator display device, etc.) in the cabin 106 or remote from the work vehicle 100. The hydraulic system 112 may include other components (e.g., valves, flow lines, pistons/cylinders, seals/gaskets, and so on), such that control of various devices may be effected with, and based upon, hydraulic, mechanical, or other signals and movements.

As noted above, the drive assembly of this disclosure may be implemented in various subsystems within the work vehicle context and may be powered in one or more formats. The following describes one example drive assembly implemented as, and incorporated within, an electric wheel end drive 130 that forms part of the drive train 108. One such wheel end drive 130 is installed just upstream from each of the four wheels 114 of the work vehicle 100. Each wheel end drive 130 itself, or one or more components thereof, may thus be considered a "final" drive due to its location proximate the associated wheel 114 and its functioning to provide the last or nearly last gear ratio for the associated wheel 114. The wheel end drives 130 may differ at each or pairs (e.g., front and rear) of the wheels 114. However, due to the bi-directional functionality of the drive assembly, the wheel end drives 130 are identical for all wheels 114, and as such, only one will be detailed below. Moreover, while the example wheel end drive 130 is electric, it may be operated by a different input power format (e.g., hydraulic or mechanical). The example wheel end drive 130 is also described herein as having multiple (e.g., two) electric machines for input power. However, the wheel end drive 130 may be operated with more than two electric machines. As described below, various types of intermediate input gearing may be utilized or omitted depending on the operating parameters (e.g., speed and torque) of the electric machines and/or the drive assembly itself and the wheels 114. As will be described, the example wheel end drive 130 is a multiple-mode drive operable to output multiple speed and torque ranges for tractive power to the wheels 114. Thus, while the engine 120 supplies prime power for the electric machine(s), the wheel end drives 130 are the primary power (and speed and torque) influencers to the wheels 114, such that a central range transmission, axles or other upstream speed- and torque-changing gearing may be, and in the example implementation is, omitted from the work vehicle 100.

Figure 2B:
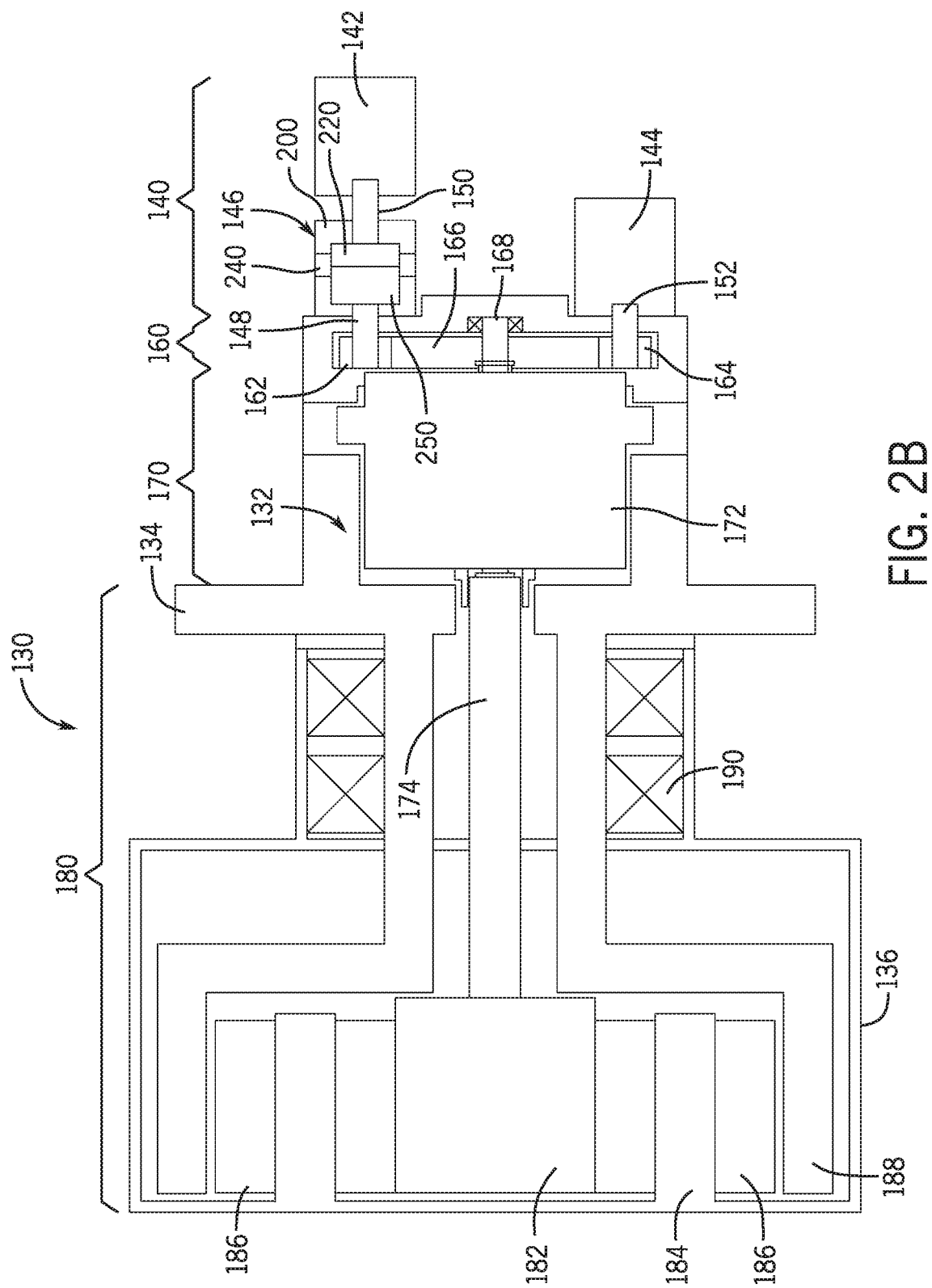
FIG. 2B is a schematic diagram of an example implementation of the disclosed wheel end drive that may be incorporated in the example work vehicle of FIG. 1.

Referring also to FIG. 2B, the example wheel end drive 130 includes as principal components an electric machine input arrangement 140, a combination gear arrangement 160, an electric machine output arrangement 170, and a wheel end planetary gear set 180, arranged partially or completely within an end drive housing 132. Generally, the wheel end drive 130 may be assembled to the vehicle chassis 102, such as by a mounting flange 134 of the housing 132, in a fixed orientation in the case of the rear wheels 114 or pivotally, about an upright, generally vertical or vertically canted, steering axis (not shown), in the case of the steered front wheels 114. Generally, the outboard wheel end drive 130 may be configured in any way suitable to mount the associated wheel 114.

In one example, the electric machine input arrangement 140 includes a first electric machine (or "motor") 142 and a second electric machine (or "motor") 144. The first electric machine 142 is coupled to the combination gear arrangement 160 via a first electric machine input gear assembly 146 and shafts 148, 150. Generally, the second electric machine 144 is coupled to the combination gear arrangement 160 via drive shaft 152. As such, the torque from the first electric machine 142 has a gear ratio set by the input gear assembly 146 and the second electric machine 144 has a direct (or 1:1) gear ratio. The electric machines 142, 144 may be the same or different relative to one another and/or have the same or different speed and/or torque capabilities.

As described in greater detail below, the first electric machine input gear assembly 146 may include a planetary gear set 220 within a housing 200 that selectively modifies the torque and/or speed of the power from the first electric machine 142 in dependence on the positions of one or more clutch apparatuses 240, 250. Generally, the input gear assembly 146 enables enhanced capability, range, and performance of the wheel end drive 130 from the individual and/or cooperating electric machines 142, 144 (e.g., without requiring more expensive electric machines and/or gearing arrangements). Additional details regarding the electric machine input arrangement 140 are provided below.

The combination gear arrangement 160 generally operates to combine the power inputs from the first and second electric machines 142, 144 of the electric machine input arrangement 140. In one example, the combination gear arrangement 160 includes a first outer gear 162 that receives power from the first electric machine 142 (via the first electric machine input gear assembly 146) and a second outer gear 164 that receives power from the second electric machine 144. The outer gears 162, 164 are enmeshed with a center gear 166 mounted on a drive shaft 168 that functions to combine the torque from the first and second electric machines 142, 144.

The electric machine output arrangement 170 is configured to receive the power from the combination gear arrangement 160 and transfer the power to the wheel end planetary gear set 180, discussed below. In one example, the electric machine output arrangement 170 includes an electric machine output gear set 172 to modify the characteristics of the power through the electric machine output arrangement 170. A wheel end drive shaft 174 may couple the output of the electric machine output arrangement 170 to the wheel end planetary gear set 180, which in turn transfer the power to the associated wheel 114.

Depending on the speed and torque requirements, the wheel end planetary gear set 180 may take various forms or be omitted. In one example, the wheel end planetary gear set 180 is a single stage planetary gear set having a sun gear 182 and a carrier 184 that supports planet gears 186 that enmesh with a ring gear 188. In one example, the carrier 184 may be fixed to a wheel hub (not shown) of the associated wheel 114 directly, or the carrier 184 may be contained within an outboard wheel end housing portion 136 of housing 132 that couples to the wheel hub. The ring gear 188 may be fixed to or formed integral with the mounting flange 134 introduced above. As such, the example outboard gear set 180 is a sun-in, carrier out planetary arrangement, although various other configurations are envisioned, including the omission of an outboard gear set or the carrier and/or the outboard wheel end housing portion 136 being formed by or directly coupled to the wheel hub of the wheel 114. The wheel end drive 130 further includes one or more wheel bearings 190 within the housing 132 to allow the carrier 184 and/or outboard wheel end housing portion 136 to rotate relative to the vehicle chassis 102 about a generally lateral, or side to side, fixed or pivotal drive or rotation axis.

Referring now to FIGS. 3-8, the following provides additional details regarding the electric machine input arrangement 140 and the combination gear arrangement 160 that may be implemented in the wheel end drive 130 introduced above.

Figure 3:
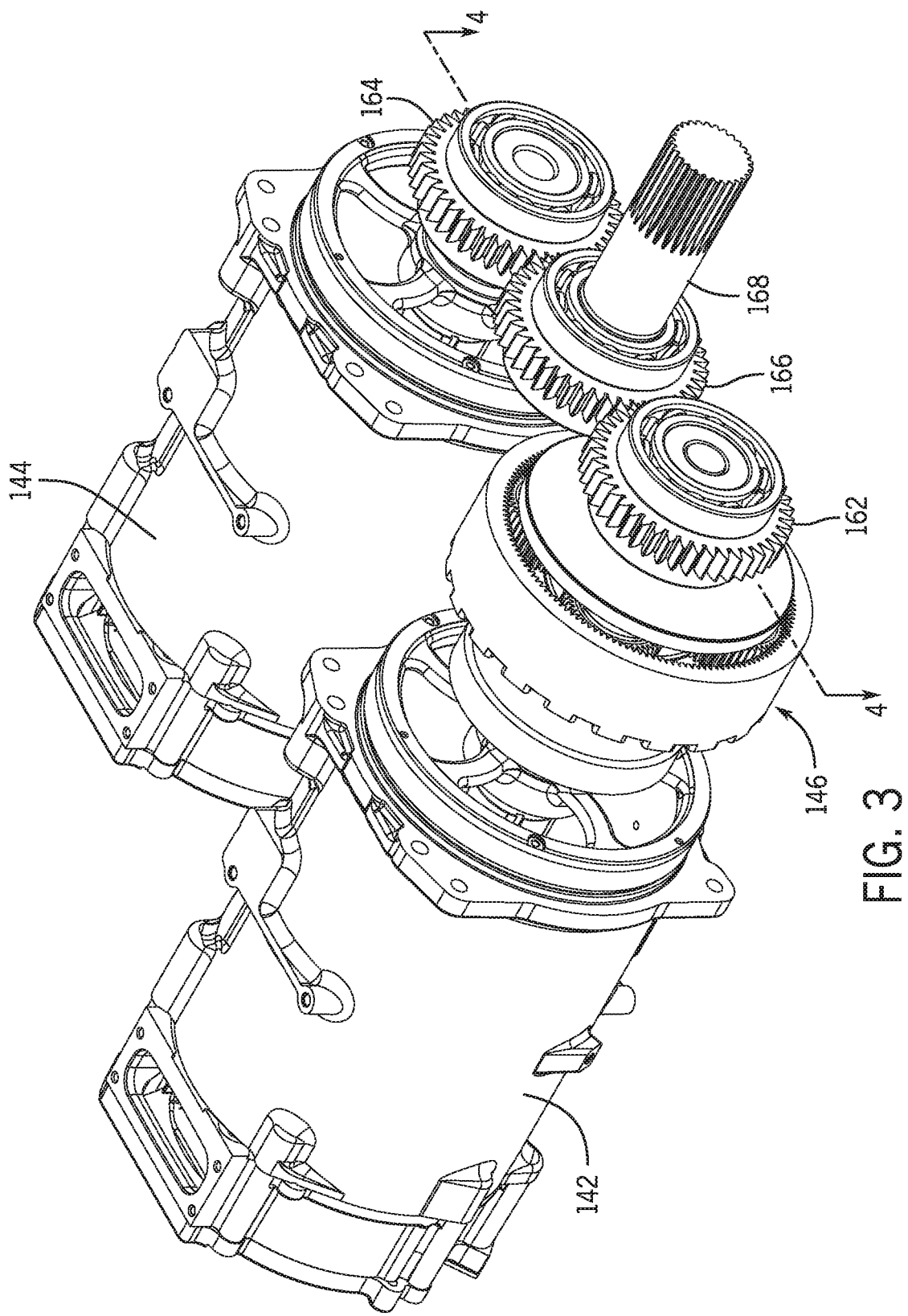
FIG. 3 is a partial isometric view of the wheel end drive depicting an electric machine input arrangement and a combination gear arrangement that may be implemented in the work vehicle of FIG. 1.

In one example, FIG. 3 particularly depicts the first electric machine 142 coupled to the combination gear arrangement 160 through the first electric machine input gear assembly 146 and the second electric machine 144 coupled directly (e.g., without an intervening gear arrangement to modify speed and/or torque) to the combination gear arrangement 160. In the view of FIG. 3, the housings (e.g., housing 200 of FIG. 2B) of the first electric machine input gear assembly 146 and the combination gear arrangement 160 have been removed for clarity. As shown, the first electric machine input gear assembly 146 is coupled to drive the first outer gear 162 of the combination gear arrangement 160 with power from the first electric machine 142; and the second outer gear 164 is driven directly by the second electric machine 144. In turn, the first and second outer gears 162, 164 are each coupled to the center gear 166 of the combination gear arrangement 160, which functions to combine the torques from the electric machines 142, 144 to output the power via the drive shaft 168 to the electric machine output arrangement 170, discussed above. In this manner, the first and second electric machines 142, 144 may provide output power through the combination gear arrangement 160 in various modes in which the electric machines 142, 144 operate in combination with one another or individually, depending on the torque and speed requirements for the wheel end drive 130. In this example, the first electric machine input gear assembly 146 enables a variation or conditioning of the power to the electric machine output arrangement 170 (FIG. 2B) that would otherwise be challenging for the two electric machines 142, 144 to deliver, as discussed in greater detail below.

Figure 4:
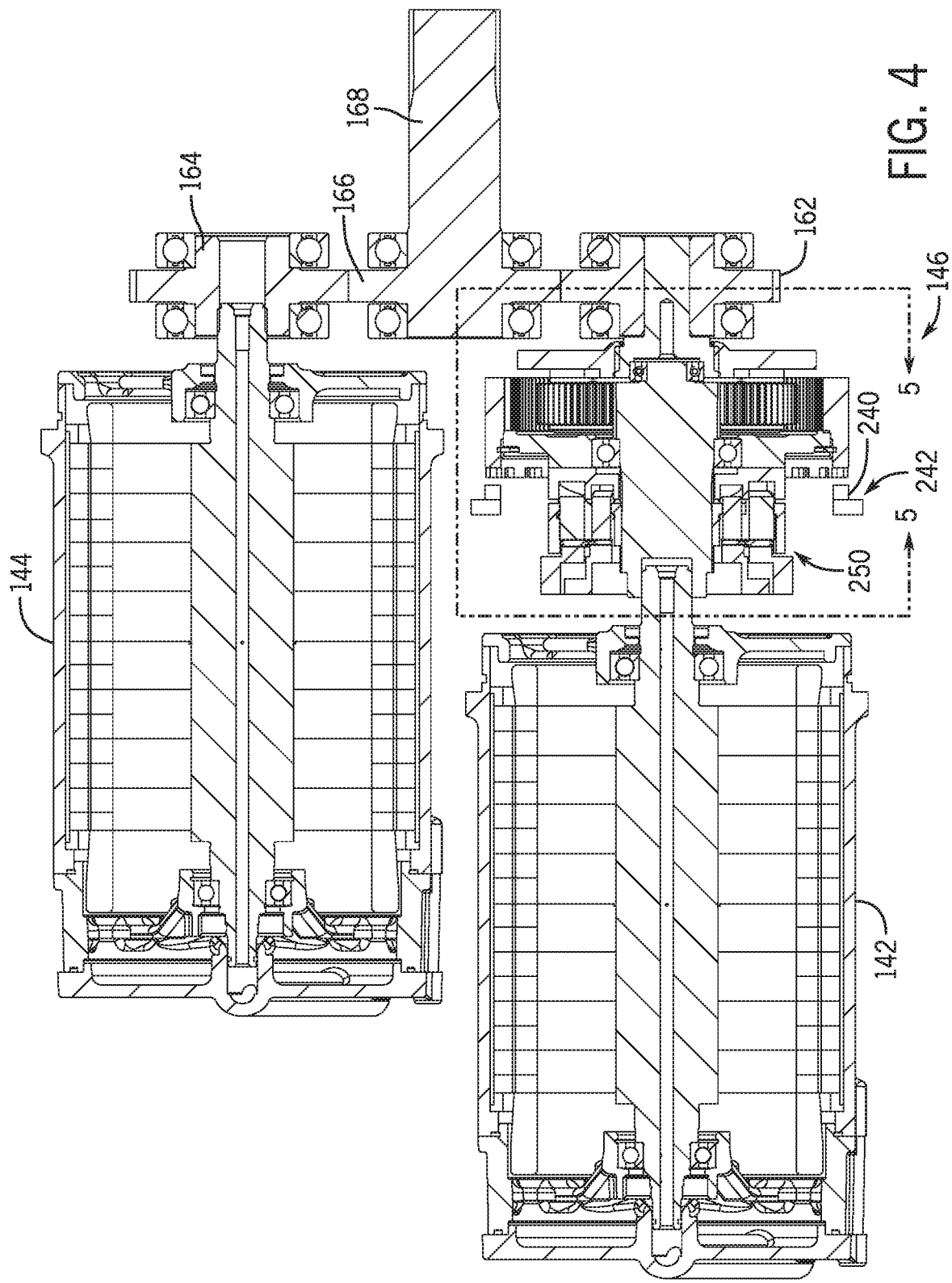
FIG. 4 is a cross-sectional view of the electric machine input arrangement and the combination gear arrangement that may be implemented in the work vehicle of FIG. 1.
Figure 5:
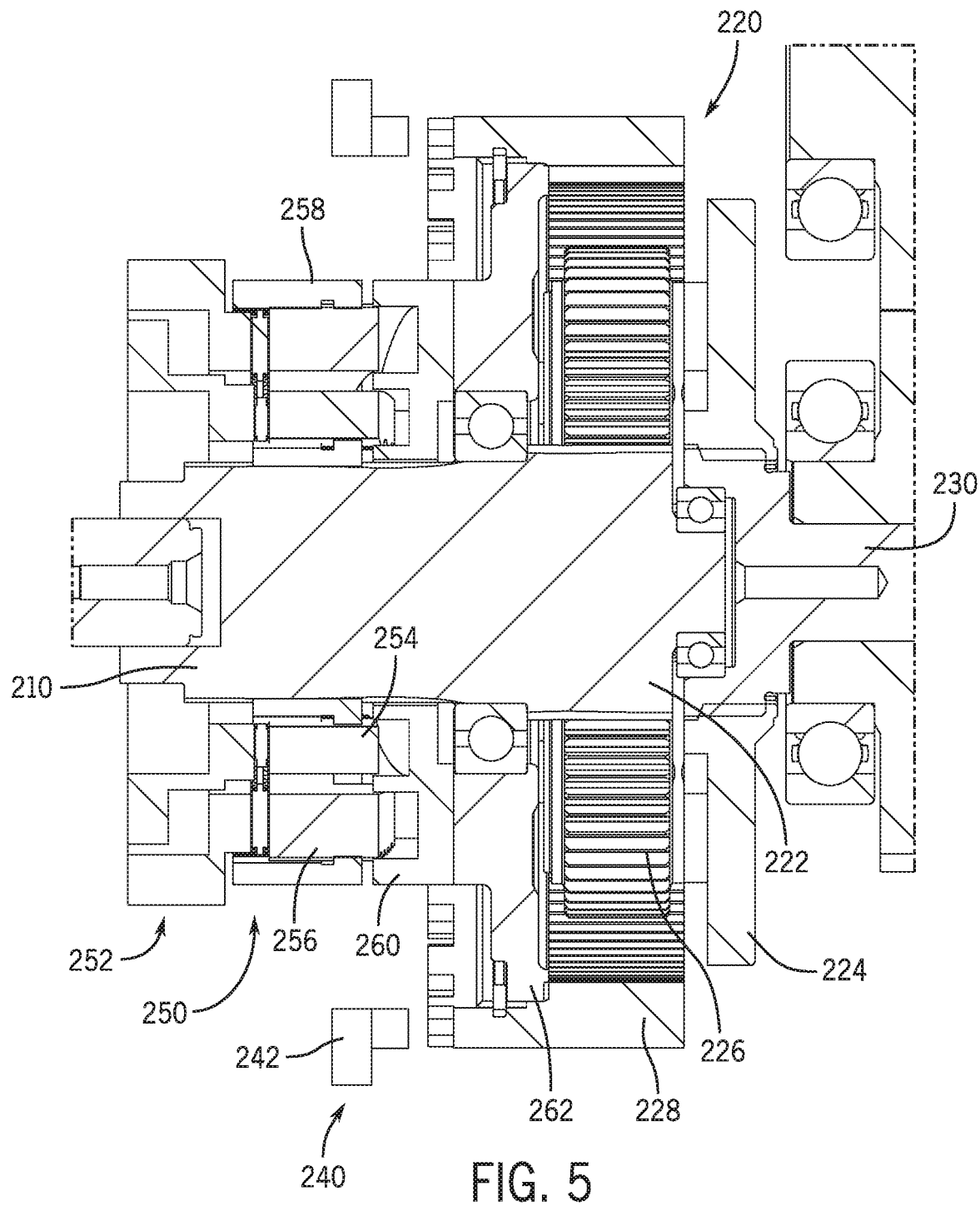
FIG. 5 is a more detailed cross-sectional view of a first electric machine input gear assembly of the electric machine input arrangement of FIGS. 3 and 4.
Figure 6:
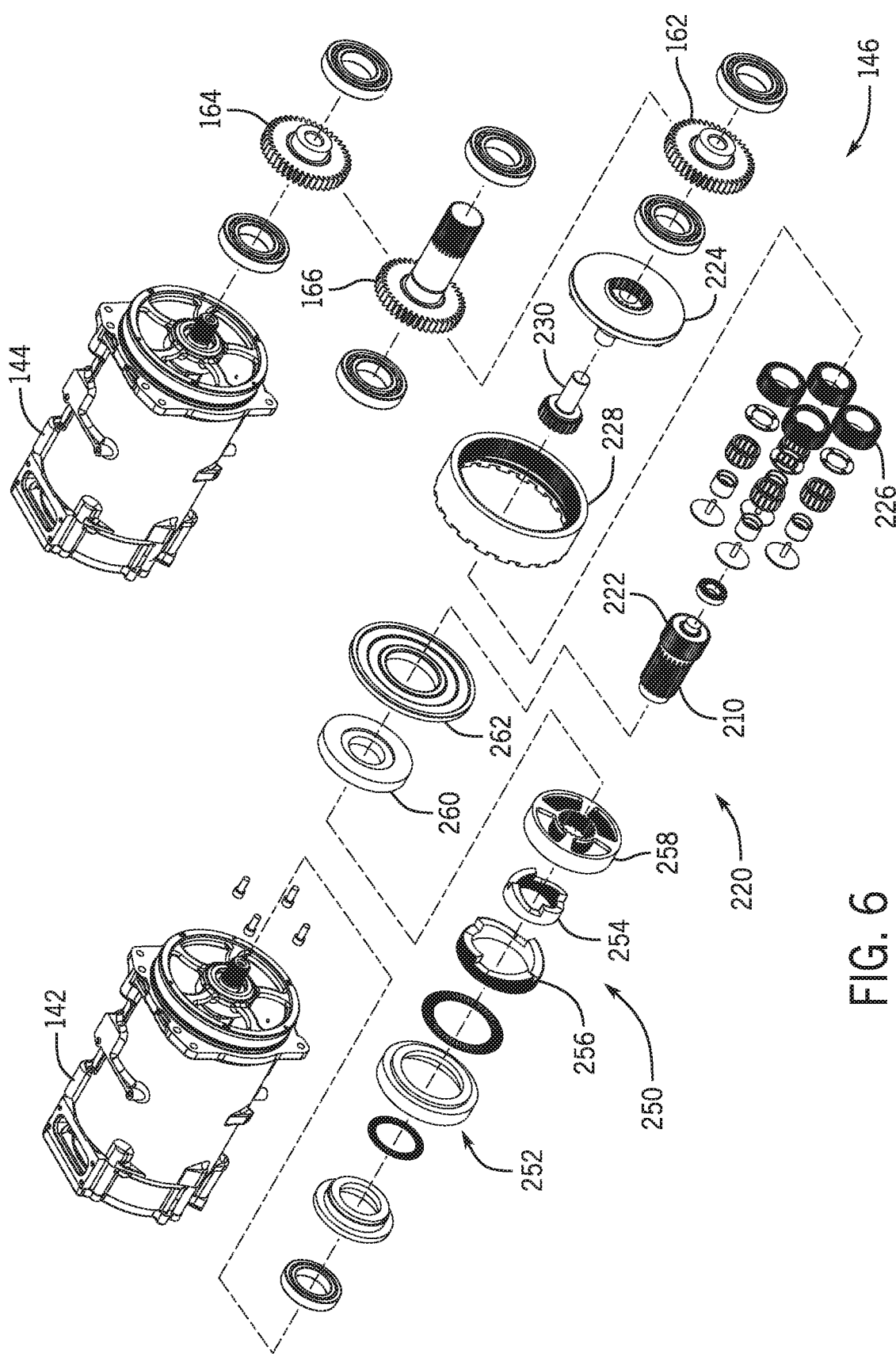
FIG. 6 is a partial exploded view of the electric machine input arrangement and the combination gear arrangement of FIGS. 3 and 4.
Figure 7:
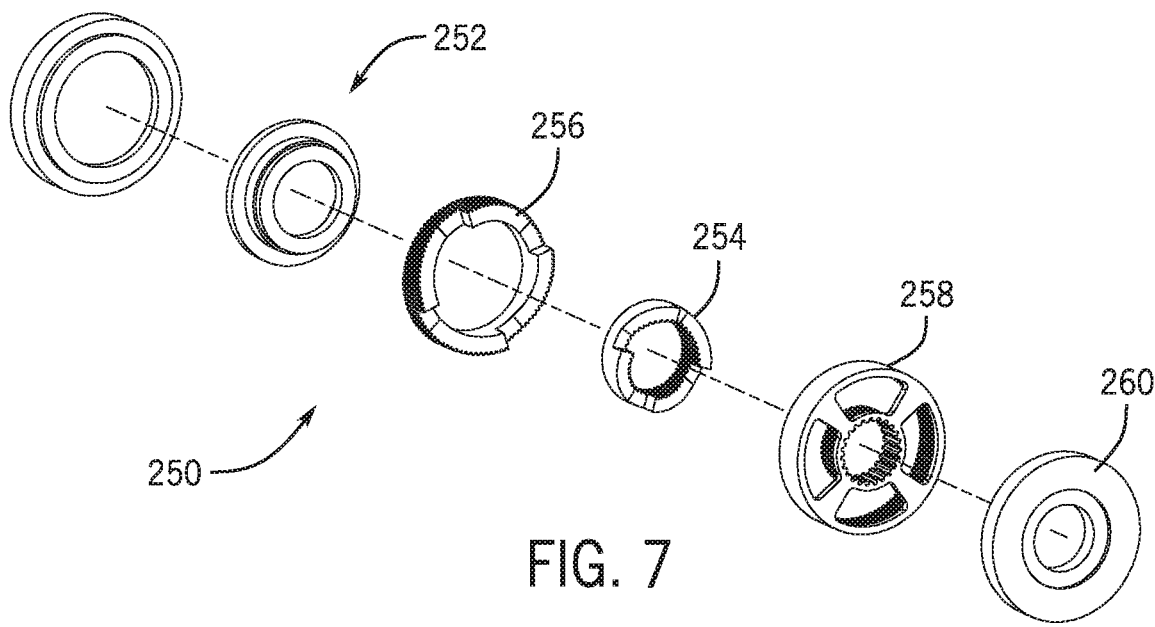
FIGS. 7 and 8 are exploded isometric side views of a direct clutch apparatus of the electric machine input arrangement of FIGS. 3 and 4.

Reference is now made to FIG. 4, which is a cross-sectional view of the electric machine input arrangement 140 and the combination gear arrangement 160, and FIG. 5, which is a detail view of the first electric machine input gear assembly 146. As in FIG. 3, the housings (e.g., housing 200) of the electric machine input arrangement 140 and the combination gear arrangement 160 have been removed in FIGS. 4 and 5 for clarity.

As shown, the first electric machine input gear assembly 146 may receive power from the first electric machine 142 via an input (or drive) shaft 210 coupled to electric machine shaft 150 and to output power via an output shaft 230 (or other type of output element) coupled to or integral with shaft 152 of the combination gear arrangement 160. As introduced above, in this example, the first electric machine input gear assembly 146 includes an input planetary gear set 220 to selectively condition the power between the input and output shafts 210, 230.

Depending on the speed and torque requirements, the input planetary gear set 220 may take various forms. In one example, the input planetary gear set 220 is a single stage planetary gear set having a sun gear 222 and a carrier 224 that supports planet gears 226 positioned to enmesh with a ring gear 228. In one example, the sun gear 222 is integral with or otherwise fixed to the input shaft 210, and the carrier 224 may be fixed or splined to the gear set output shaft 230. As such, the example input planetary gear set 220 is a sun-in, carrier out planetary arrangement, although various other configurations may be provided.

Power through the input planetary gear set 220 may be enabled and/or modified by one or more of the clutch apparatuses, including a first (or low) clutch apparatus 240 and a second (or direct or high) clutch apparatus 250. Additional reference is made to FIG. 6, which is an exploded view generally corresponding to the view of FIG. 3, and FIGS. 7 and 8, which are exploded views from each side of the direct clutch apparatus 250.

Generally, the low clutch apparatus 240 is formed by a bidirectional clutch element (or "dog") 242 that selectively engages with the ring gear 228. In one example, the clutch element 242 is generally ring shaped with one or more series of splines and/or other engagement elements (e.g., representing a combination of cavities, protrusions, teeth, or dogs configured for circumferential engagement). In particular, the low clutch apparatus 240 is rotationally fixed or locked to the stationary housing 200 (FIG. 2B) via a first set of splines that enable axial movement within the housing 200 towards and away from the ring gear 228. As introduced above, the housing 200 of the assembly 146 functions as a reaction member that is fixed axially and radially with respect to the rotation axis against which forces may be applied. The low clutch apparatus 240 has a disengaged position in which the low clutch apparatus 240 is separated from the ring gear 228 such that the ring gear 228 may rotate relative to the housing 200 (FIG. 2B); and the low clutch apparatus 240 has an engaged position in which the engagement elements of low clutch apparatus 240 engage the ring gear 228 such that the low clutch apparatus 240 locks the ring gear 228 relative to the housing 200 (FIG. 2B) (e.g., to prevent rotation). Generally, the low clutch apparatus 240 may be axially repositioned between the engaged and disengaged positions by one or more actuators to implement a modification of the speed ratio and torque through the input planetary gear set 220. As discussed below, the engaged position of the low clutch apparatus 240 enable power flow through the gear set 220 at a deeper (e.g., higher) gear ratio.

Although not shown in detail, the low clutch apparatus 240 may be axially repositioned by one or more appropriate actuators, such one or more electromechanical solenoids, hydraulic actuators, and/or springs arranged within and/or exterior to the housing 200 (FIG. 2B). Such actuators may be commanded based on signals from the control system 110.

The direct clutch apparatus 250 is formed by one or more support elements 252 that support a first clutch element (or "dog") 254 and a second clutch element (or "dog") 256. As shown, the first and second clutch elements 254, 256 are ring shaped and generally concentric with one another with the first clutch element 254 radially positioned within the second clutch element 256. In effect, the first and second low clutch elements 254, 256 may be considered a bifurcated clutch arrangement to influence power flow in individual rotation directions.

Figure 8:
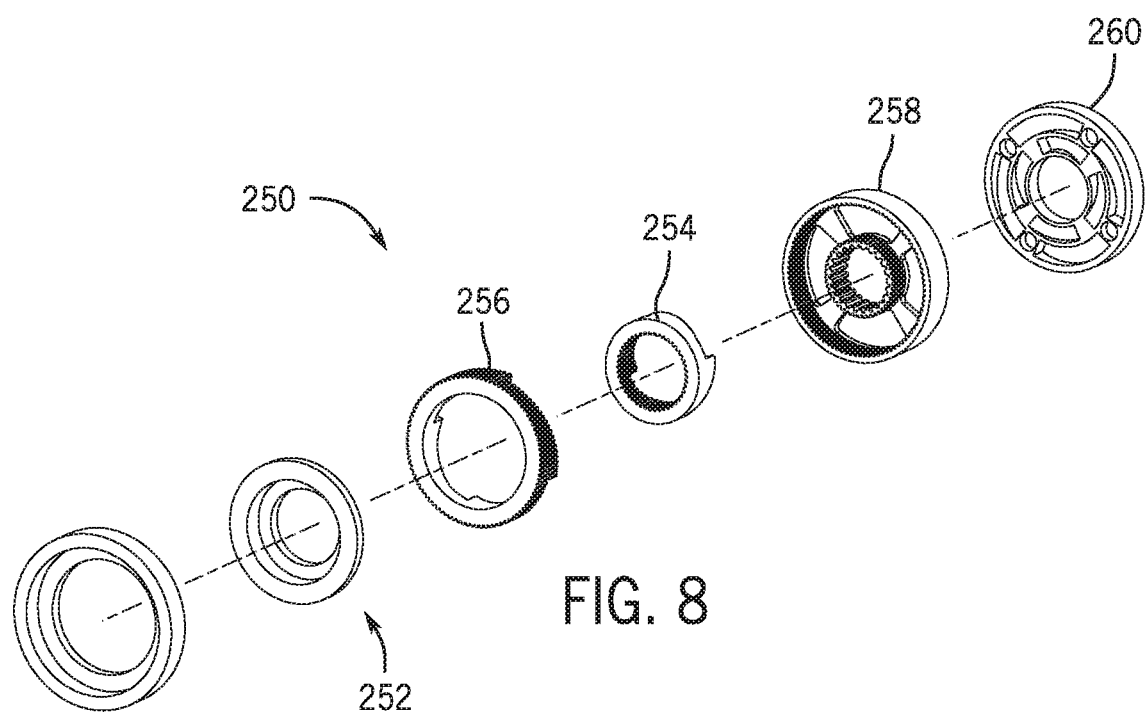

The first and second clutch elements 254, 256 are arranged within a clutch frame 258. As best shown in FIG. 8, the clutch frame 258 has an outer cylindrical flange with inner splines and an inner cylindrical flange with inner and outer splines. The first clutch element 254 has outer splines that engage corresponding inner splines along the outer cylindrical flange of the clutch frame 258; and the second clutch element 256 has inner splines that engage corresponding outer splines along the inner cylindrical flange of the clutch frame 258. The splined arrangements enable the first and second clutch elements 254, 256 to move axially within the clutch frame 258 between respective engaged and disengaged positions, discussed below.

In addition to the splined couplings between the first and second clutch elements 254, 256 and the clutch frame 258, the inner splines on the inner cylindrical flange of the clutch frame 258 are also enmeshed with corresponding splines on the input shaft 210. As a result, the first and second clutch elements 254, 256 and clutch frame 258 are splined together and configured to rotate with the input shaft 210.

The direct clutch apparatus 250 further includes a clutch frame cover 260 and clutch lock element 262 positioned on the other axial side of the clutch frame 258 relative to the first and second clutch elements 254, 256, e.g., axially in between the clutch elements 254, 256 and the planetary gear set 220. The clutch frame cover 260 is fixed to the clutch lock element 262, and the clutch lock element 262 is fixed to the ring gear 228, as best shown in FIG. 5.

In one embodiment, each of the clutch elements 254, 256 is respectively formed with engagement elements (e.g., representing a combination of cavities, protrusions, teeth, or dogs configured for circumferential engagement) oriented toward the clutch frame cover 260. In this example, each of the engagement elements of the clutch elements 254, 256 is a protrusion with a squared or perpendicular side and a ramped side. The squared sides of the engagement elements of the first clutch element 254 are oriented in a rotation direction opposite to the squared sides of the engagement elements of the second clutch element 256. In this manner, the clutch elements 254, 256 are directional to be selectively engaged in different rotation directions.

The clutch frame cover 260 includes circumferential rows of engagement elements (e.g., representing a combination of cavities, protrusions, teeth, or dogs configured for circumferential engagement) corresponding to the radial positions of the engagement elements extending from the clutch elements 254, 256. Whereas the engagement elements of the clutch elements 254, 256 are protruding perpendicular and ramped structures, as noted above, the engagement elements of the clutch frame cover 260 are indentions or slots, each with corresponding squared or perpendicular side and a ramped side that circumferentially oppose the radially paired set of engagement elements of the clutch elements 254, 256 that selectively engage in a single rotation direction for each element 254, 256.

As a result of this arrangement, each of the clutch elements 254, 256 may selectively interact in engaged and disengaged positions with the clutch frame cover 260, e.g., such that the input shaft 210 may selectively interact with the ring gear 228. In each disengaged position, the respective clutch element 254, 256 is axially positioned at a distance from the clutch frame cover 260; and in each engaged position, the respective clutch element 254, 256 is moved towards the clutch frame cover 260 such that the engagement elements of the respective clutch element 254, 256 and clutch frame cover 260 engage on another.

Although not shown in detail, the direct clutch apparatus 250 may be axially repositioned by one or more appropriate actuators, such one or more electromechanical solenoids, hydraulic actuators, and/or springs arranged within and/or exterior to the housing 200 (FIG. 2B). Such actuators may be commanded based on signals from the control system 110.

When in the disengaged positions, the clutch elements 254, 256 may rotate independently from the clutch frame cover 260. However, when the first clutch element 254 is in the engaged position, the first clutch element 254 is locked to the clutch frame cover 260 in the first rotation direction. Due to the ramped engagement elements, when the first clutch element 254 is in the engaged position, the first clutch element 254 may overrun the clutch frame cover 260 in the second rotation direction. Similarly, when the second clutch element 256 is in the engaged position, the second clutch element 256 is locked to the clutch frame cover 260 in the second rotation direction; and due to the ramped engagement elements, when the second clutch element 256 is in the engaged position, the second clutch element 256 may overrun the clutch frame cover 260 in the first rotation direction. When both clutch elements 254, 256 are engaged, the clutch elements 254, 256 are collectively locked to the clutch frame cover 260 in both rotation directions.

As noted above, the clutch elements 254, 256 are splined to the clutch frame 258, which in turn is splined with the input shaft 210; and the clutch frame cover 260 is fixed to the clutch lock element 262, which in turn is fixed to the ring gear 228. As such, when the first clutch element 254 and/or the second clutch element 256 are in the engaged position(s), the ring gear 228 is rotationally fixed to the input shaft 210 in the associated rotation direction(s). As a result, these engaged positions enable the entire planetary gear set 220 (e.g., the sun gear 222, the carrier 224, the planet gears 226, and the ring gear 228) to rotate as a unit with the input shaft 210 about an axis defied by the input shaft 210. In other words, the engaged positions of the clutch elements 254, 256 enable a direct or 1:1 ratio of the first electric machine 142 and input shaft 210 relative to the output shaft 230.

As a result of the configuration of the clutch apparatuses 240, 250 and planetary gear set 220, the input gear assembly 146 may be considered to have at least three states, including a disconnected state, a low state, and a direct state.

In the disconnected state, the low clutch apparatus 240 and the direct clutch apparatus 250 are placed in the disengaged positions. As a result, any torque from the first electric machine 142 is effectively prevented from being transferred through the input gear assembly 146 into the combination gear arrangement 160 and the downstream components. The disconnected state may be used, for example, when power from the first electric machine 142 is not necessary or desired for the wheel end drive 130.

In the low state, the low clutch apparatus 240 is placed in the engaged position and the direct clutch apparatus 250 is placed in the disengaged position in each rotation direction. As a result of this configuration, power flows from the first electric machine 142 through the input shaft 210 to the sun gear 222, and to the planet gears 226. Further, since the ring gear 228 is locked to the housing 200 by the low clutch apparatus 240, the power flows through the planet gears 226 to drive the planet carrier 224 and the output shaft 230. As such, the speed of the power is reduced by the gear ratio between the sun gear 222, the planet gears 226, and the planet carrier 224, thereby reducing the speed of the power while increasing the torque output. As one example, the gear reduction through this power flow path may be 4:1, 5:1, or higher or lower ratios.

In the direct state, the low clutch apparatus 240 is positioned in the disengaged position and the direct clutch apparatus 250 is placed in the engaged position in at least the commanded rotation direction. As noted above, the first clutch element 254 is placed in the engaged position to transfer power in the first rotation direction, and the second clutch element 256 is placed in the engaged position to transfer power in the second rotation direction. As also noted above, engagement of the direct clutch apparatus 250 enables the entire input planetary gear set 220 to rotate as a unit, thereby resulting in a direct (or 1:1) gear ratio.

The different states of the first electric machine 142 and the combination of the first electric machine 142 and the second electric machine 144 enable the electric machine input arrangement 140 to operate in one or more operational modes, including a low speed/high torque (or first) mode, a high speed unassisted (or second) mode, and a high speed assisted (or third) mode.

In one example, the low speed/high torque mode may be useful during situations in which the vehicle is operating at relatively low speeds and/or in which a greater torque is necessary, such as when starting and/or when traveling up an incline. In the low speed/high torque mode, the input gear assembly 146 is placed in the low state (e.g., with the low clutch apparatus 240 engaged and the direct clutch apparatus 250 is disengaged) and each electric machine 142, 144 is activated. As a result of this arrangement, the output speed is reduced by the gear ratio resulting from the engagement of the low clutch apparatus 240, thereby increasing the torque at a corresponding ratio (e.g., by a multiple of 4 or 5 in the example discussed above). In the combination gear arrangement 160, the torque of the first electric machine 142 through the input gear assembly 146 is combined with the torque of the second electric machine 144, as reflected by the following output torque equation for the low speed/high torque mode:

$$T_O = (T_{M1})(GR) + T_{M2}$$

wherein, $T_O$ is the output torque;

$T_{M1}$ is the torque from the first electric machine;

GR is the torque multiplier resulting from the gear ratio; and $T_{M2}$ is the torque from the second electric machine.

In one example, the high speed unassisted mode may be useful during situations in which the speeds are higher than those of the low speed/high torque mode and/or when the additional torque from the first electric machine 142 is not needed for the requested or desired application. In the high speed unassisted mode, the input gear assembly 146 is placed in the disconnected state (e.g., with the low clutch apparatus 240 and the direct clutch apparatus 250 are disengaged), the first electric machine 142 is deactivated, and the second electric machine 144 is activated. As a result of this arrangement, only the torque of the second electric machine 144 is transferred through the combination gear arrangement 160, as reflected by the following output torque equation for the high speed unassisted mode:

$$T_O = T_{M2}$$

wherein, $T_O$ is the output torque; and $T_{M2}$ is the torque from the second electric machine.

In one example, the high speed assisted mode may be useful during situations in which the speeds are higher than those of the low speed/high torque mode and/or when the additional torque from the first electric machine 142 is needed or beneficial for the requested or desired application. In the high speed assisted mode, the input gear assembly 146 is placed in the direct state (e.g., with the low clutch apparatus 240 disengaged and the direct clutch apparatus 250 is engaged in at least the commanded rotation direction) and each electric machine 142, 144 is activated. As a result of this arrangement, the torques of both electric machines 142, 144 are combined in the combination gear assembly, as reflected by the following output torque equation for the high speed assisted mode:

$$T_O = T_{M1} + T_{M2}$$

wherein, $T_O$ is the output torque;

$T_{M1}$ is the torque from the first electric machine; and $T_{M2}$ is the torque from the second electric machine.

Accordingly, example embodiments discussed above provide a drive assembly as a wheel end drive for a work vehicle. The dual electric machines on the input side of the wheel end drive may be operated individually and cooperatively as desired or necessary to provide a single output with full torque and speed range. In particular, the wheel end drive discussed above enables the use of two relatively lower torque electric machines (e.g., at a relatively lower cost) for the same output as a single high torque motor.

Also, the following examples are provided, which are numbered for easier reference.

1. A drive assembly for a work vehicle comprising: an electric machine input arrangement comprising: a first electric machine configured to generate a first source of power, an electric machine input gear assembly configured to receive the first source of power from the first electric machine, and a second electric machine configured to generate a second source of power; a combination gear arrangement coupled to selectively receive the first source of power from the electric machine input gear assembly and the second source of power from the second electric machine to produce a combined power; and an electric machine output arrangement configured to receive and transfer the combined power from the combination gear arrangement.

2. The drive assembly of example 1, wherein the electric machine input gear assembly to selectively condition the first source of power for the combination gear arrangement according to a plurality of gear ratios, and wherein the combination gear arrangement is configured to directly receive the second source of power from the second electric machine.

3. The drive assembly of example 1, further comprising a control system coupled to the electric machine input gear assembly and configured to selectively operate the electric machine input gear assembly in one of at least a low state in which the electric machine input gear assembly transfers the first source of power to the combination gear arrangement at a reduced gear ratio and a direct state in which the electric machine input gear arrangement transfers the first source of power to the combination gear arrangement at a direct gear ratio.

4. The drive assembly of example 3, wherein the control system is further configured to operate the electric machine input gear assembly in a disconnected state in which the electric machine input gear assembly disconnects the first source of power through the electric machine input gear assembly.

5. The drive assembly of example 4, wherein the control system is configured to selectively operate the electric machine input arrangement in one of at least: a first mode in which the first electric machine is activated, the second electric machine is activated, and the electric machine input gear assembly is placed into the low state, and a second mode in which the first electric machine is deactivated, the second electric machine is activated, and the electric machine input gear assembly is placed into the disconnected state.

6. The drive assembly of example 5, wherein the control system is further configured to selectively additionally operate the electric machine input arrangement in a third mode in which the first electric machine is activated, the second electric machine is activated, and the electric machine input gear assembly is placed into the direct state.

7. The drive assembly of example 6, wherein the electric input arrangement comprises: a housing including a first housing element forming a reaction member; a drive shaft rotatable about a drive axis relative to the reaction member in a first rotation direction and alternatively a second rotation direction; a planetary gear set coupled to the drive shaft and configured to selectively rotate an output element in the first rotation direction and in the second rotation direction; a first clutch apparatus coupled to the reaction member and configured to interface the planetary gear set with the reaction member to effect a first rotation speed of the output element in the first rotation direction and in the second rotation direction; and a second clutch apparatus coupled to interface with the planetary gear set to selectively effect a second rotation speed of the output element in the first rotation direction and in the second rotation direction.

8. The drive assembly of example 7, wherein the first clutch apparatus includes a bidirectional clutch element that selectively engages the planetary gear set.

9. The drive assembly of example 8, wherein the second clutch apparatus includes a first clutch element configured to interface with the planetary gear set in the first rotation direction and a second clutch element configured to interface with the planetary gear set in the second rotation direction.

10. The drive assembly of example 9, wherein the planetary gear set includes at least one sun gear fixed to the drive shaft, at least one planet gear enmeshed with the sun gear, at least one carrier supporting the at least one planet gear, and at least one ring gear enmeshed with the at least one planet gear; and wherein the first clutch apparatus is configured to interface with the planetary gear set by locking the ring gear to the housing.

11. The drive assembly of example 10, wherein the second clutch apparatus is configured to interface with the planetary gear set by rotationally fixing the drive shaft to the at least one planet carrier.

12. The drive assembly of example 11, wherein the second clutch apparatus includes a clutch frame splined to the drive shaft that radially supports the first clutch element and the second clutch element to translate axially between respective engaged and disengaged positions to selectively interface with the planetary gear set.

13. The drive assembly of example 12, wherein the second clutch apparatus further includes: a clutch frame cover configured to receive at least a portion of the first clutch element and the second clutch element when the second clutch apparatus interfaces with the planetary gear set, and a clutch lock securing the clutch frame cover to the ring gear.

14. The drive assembly of example 13, wherein the at least one planet carrier is rotationally fixed to the output element.

15. The drive assembly of example 1, wherein the drive assembly is a wheel end drive for a wheel of the work vehicle, and wherein the electric machine output arrangement is coupled to transfer the combined power to the wheel.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A drive assembly for a work vehicle comprising:
    an electric machine input arrangement comprising:
        a first electric machine configured to generate a first source of power,
        an electric machine input gear assembly configured to receive the first source of power from the first electric machine,
        a second electric machine configured to generate a second source of power,
        a housing including a first housing element forming a reaction member,
        a drive shaft rotatable about a drive axis relative to the reaction member in a first rotation direction and alternatively a second rotation direction,
        a planetary gear set coupled to the drive shaft and configured to selectively rotate an output element in the first rotation direction and in the second rotation direction,
        a first clutch apparatus coupled to the reaction member and configured to interface the planetary gear set with the reaction member to effect a first rotation speed of the output element in the first rotation direction and in the second rotation direction, and
        a second clutch apparatus coupled to interface with the planetary gear set to selectively effect a second rotation speed of the output element in the first rotation direction and in the second rotation direction;
    a combination gear arrangement coupled to selectively receive the first source of power from the electric machine input gear assembly and the second source of power from the second electric machine to produce a combined power; and
    an electric machine output arrangement configured to receive and transfer the combined power from the combination gear arrangement.

2. The drive assembly of claim 1, wherein the electric machine input gear assembly to selectively condition the first source of power for the combination gear arrangement according to a plurality of gear ratios, and wherein the combination gear arrangement is configured to directly receive the second source of power from the second electric machine.

3. The drive assembly of claim 1, further comprising a control system coupled to the electric machine input gear assembly and configured to selectively operate the electric machine input gear assembly in one of at least a low state in which the electric machine input gear assembly transfers the first source of power to the combination gear arrangement at a reduced gear ratio and a direct state in which the electric machine input gear arrangement transfers the first source of power to the combination gear arrangement at a direct gear ratio.

4. The drive assembly of claim 3, wherein the control system is further configured to operate the electric machine input gear assembly in a disconnected state in which the electric machine input gear assembly disconnects the first source of power through the electric machine input gear assembly.

5. The drive assembly of claim 4, wherein the control system is configured to selectively operate the electric machine input arrangement in one of at least:
    a first mode in which the first electric machine is activated, the second electric machine is activated, and the electric machine input gear assembly is placed into the low state, and
    a second mode in which the first electric machine is deactivated, the second electric machine is activated, and the electric machine input gear assembly is placed into the disconnected state.

6. The drive assembly of claim 5, wherein the control system is further configured to selectively additionally operate the electric machine input arrangement in a third mode in which the first electric machine is activated, the second electric machine is activated, and the electric machine input gear assembly is placed into the direct state.

7. The drive assembly of claim 1, wherein the first clutch apparatus includes a bidirectional clutch element that selectively engages the planetary gear set.

8. The drive assembly of claim 7, wherein the second clutch apparatus includes a first clutch element configured to interface with the planetary gear set in the first rotation direction and a second clutch element configured to interface with the planetary gear set in the second rotation direction.

9. The drive assembly of claim 8,
    wherein the planetary gear set includes at least one sun gear fixed to the drive shaft, at least one planet gear enmeshed with the sun gear, at least one carrier supporting the at least one planet gear, and at least one ring gear enmeshed with the at least one planet gear; and wherein the first clutch apparatus is configured to interface with the planetary gear set by locking the ring gear to the housing.

10. The drive assembly of claim 9, wherein the second clutch apparatus is configured to interface with the planetary gear set by rotationally fixing the drive shaft to the at least one planet carrier.

11. The drive assembly of claim 10, wherein the second clutch apparatus includes a clutch frame splined to the drive shaft that radially supports the first clutch element and the second clutch element to translate axially between respective engaged and disengaged positions to selectively interface with the planetary gear set.

12. The drive assembly of claim 11, wherein the second clutch apparatus further includes:
- a clutch frame cover configured to receive at least a portion of the first clutch element and the second clutch element when the second clutch apparatus interfaces with the planetary gear set, and
- a clutch lock securing the clutch frame cover to the ring gear.

13. The drive assembly of claim 12, wherein the at least one planet carrier is rotationally fixed to the output element.

14. The drive assembly of claim 1, wherein the drive assembly is a wheel end drive for a wheel of the work vehicle, and wherein the electric machine output arrangement is coupled to transfer the combined power to the wheel.

15. The drive assembly of claim 14, further comprising a wheel end planetary gear set configured to receive and condition the combined power between the electric machine output arrangement and the wheel.

16. A drive assembly for a work vehicle, comprising:
an electric machine input arrangement comprising:
- a first electric machine configured to generate a first source of power,
- an electric machine input gear assembly configured to receive and condition the first source of power from the first electric machine according to a plurality of gear ratios,
- a second electric machine configured to generate a second source of power,
- a housing including a first housing element forming a reaction member,
- a drive shaft rotatable about a drive axis relative to the reaction member in a first rotation direction and alternatively a second rotation direction,
- a planetary gear set coupled to the drive shaft and configured to selectively rotate an output element in the first rotation direction and in the second rotation direction,
- a first clutch apparatus coupled to the reaction member and configured to interface the planetary gear set with the reaction member to effect a first rotation speed of the output element in the first rotation direction and in the second rotation direction, and
- a second clutch apparatus coupled to interface with the planetary gear set to selectively effect a second rotation speed of the output element in the first rotation direction and in the second rotation direction;
a combination gear arrangement coupled to selectively receive the first source of power from the electric machine input gear assembly and the second source of power from the second electric machine to produce a combined power;

an electric machine output arrangement configured to receive and transfer the combined power from the combination gear arrangement; and a control system coupled to the electric machine input gear assembly and configured to selectively operate the electric machine input gear assembly in one of at least:
- a low state in which the electric machine input gear assembly transfers the first source of power to the combination gear arrangement at a reduced gear ratio,
- a direct state in which the electric machine input gear arrangement transfers the first source of power to the combination gear arrangement at a direct gear ratio, and
- a disconnected state in which the electric machine input gear assembly disconnects the first source of power through the electric machine input gear assembly, wherein the control system is configured to selectively operate the electric machine input arrangement in one of at least:
- a first mode in which the first electric machine is activated, the second electric machine is activated, and the electric machine input gear assembly is placed into the low state,
- a second mode in which the first electric machine is deactivated, the second electric machine is activated, and the electric machine input gear assembly is placed into the disconnected state, and
- a third mode in which the first electric machine is activated, the second electric machine is activated, and the electric machine input gear assembly is placed into the direct state.

17. A wheel end drive coupled to a wheel of a work vehicle comprising:
an electric machine input arrangement comprising:
- a first electric machine configured to generate a first source of power,
- an electric machine input gear assembly configured to receive the first source of power from the first electric machine, and
- a second electric machine configured to generate a second source of power,
- a housing including a first housing element forming a reaction member,
- a drive shaft rotatable about a drive axis relative to the reaction member in a first rotation direction and alternatively a second rotation direction,
- a planetary gear set coupled to the drive shaft and configured to selectively rotate an output element in the first rotation direction and in the second rotation direction,
- a first clutch apparatus coupled to the reaction member and configured to interface the planetary gear set with the reaction member to effect a first rotation speed of the output element in the first rotation direction and in the second rotation direction, and
- a second clutch apparatus coupled to interface with the planetary gear set to selectively effect a second rotation speed of the output element in the first rotation direction and in the second rotation direction;
a combination gear arrangement coupled to selectively receive the first source of power from the electric machine input gear assembly and the second source of power from the second electric machine to produce a combined power;

an electric machine output arrangement configured to receive and transfer the combined power from the combination gear arrangement; and a wheel end planetary gear set coupled to receive and transfer the combined power from the electric machine output arrangement to the wheel of the work vehicle.

18. The wheel end drive of claim 17, further comprising:

a control system coupled to the electric machine input gear assembly and configured to selectively operate the electric machine input gear assembly in one of at least:

a low state in which the electric machine input gear assembly transfers the first source of power to the combination gear arrangement at a reduced gear ratio, a direct state in which the electric machine input arrangement transfers the first source of power to the combination gear arrangement at a direct gear ratio, and a disconnected state in which the electric machine input gear assembly disconnects the first source of power through the electric machine input gear assembly;

wherein the control system is configured to selectively operate the electric machine input arrangement in one of at least:

a first mode in which the first electric machine is activated, the second electric machine is activated, and the electric machine input gear assembly is placed into the low state, a second mode in which the first electric machine is deactivated, the second electric machine is activated, and the electric machine input gear assembly is placed into the disconnected state, and a third mode in which the first electric machine is activated, the second electric machine is activated, and the electric machine input gear assembly is placed into the direct state.

\* \* \* \* \*